Jan. 30, 1934.  M. SHOELD  1,945,002

PROCESS OF TREATING GAS

Filed May 5, 1931

INVENTOR.
Mark Shoeld.
BY Jesse R. Langley
ATTORNEY.

Patented Jan. 30, 1934

1,945,002

UNITED STATES PATENT OFFICE 1,945,002

PROCESS OF TREATING GAS

Mark Shoeld, Mount Lebanon Township, Allegheny County, Pa., assignor to The Koppers Company of Delaware, a corporation of Delaware Application May 5, 1931. Serial No. 535,157

3 Claims. (Cl. 23—150)

This invention relates to processes of treating gas and more particularly to the manufacture of relatively pure carbon dioxide from gas mixtures containing the same.

The present invention comprises an improved process by which gas containing carbon dioxide is brought into intimate contact with a solution containing alkali carbonate whereby alkali bicarbonate solution is formed and the resulting solution is then treated with steam to decompose the bicarbonate. The carbonate solution which is re-formed is reused for the absorption of additional carbon dioxide.

Examples of apparatus which may be used in the present process are shown in the accompanying drawing in which,—

Figure 1:
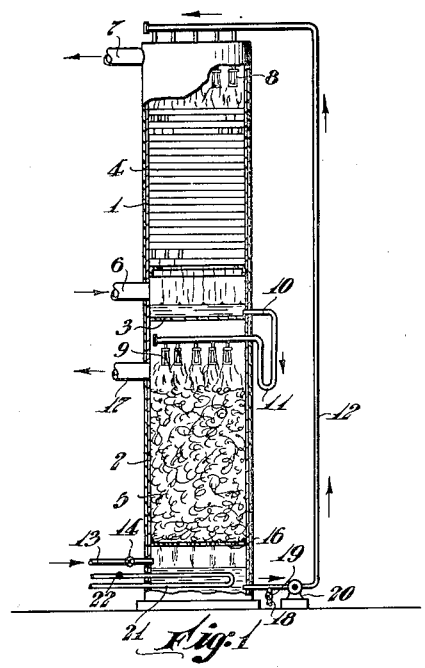
Figure 2:
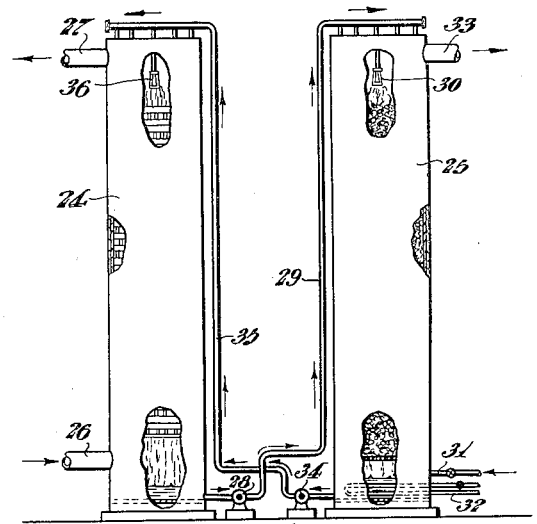

Figure 1 is a sectional view, partly in elevation, of one form of apparatus; and Figure 2 is an elevational view, partly in section, of another form of apparatus.

Referring to Fig. 1 the apparatus shown comprises a tower divided into two compartments 1 and 2 by a partition 3. These compartments are partially filled with any desired form of material to bring about the desired contact between gas and liquid. In compartment 1, for instance, wooden hurdles 4 may be employed and in compartment 2 steel turnings 5 may be used. Other contact materials such as spiral tile or coke are satisfactory.

An inlet 6 for gas containing carbon dioxide is situated near the bottom of the compartment 1 immediately below the hurdles 4. An outlet 7 for gas from which carbon dioxide has been removed is situated near the top of the compartment 1.

Sprays 8 are positioned in compartment 1 above the hurdles 4, and sprays 9 are positioned above the steel turnings 5 in the compartment 2. A pipe 10 forming a seal 11 leads from the bottom of compartment 1 to the sprays 9. A pipe 12 leads from the bottom of compartment 2 to the sprays 8 provided in the top of compartment 1.

A pipe 13 having a valve 14 is connected to the compartment 2 and conducts steam into this compartment beneath a perforated plate 16 which supports the steel turnings 5. An outlet pipe 17 for gas is provided near the top of the compartment 2 above the steel turnings 5.

In the operation of this form of apparatus, alkali carbonate solution is passed into the system through a pipe 18 having a valve 19 and connected to the pipe 12. By means of a pump 20 the desired amount of solution is kept in circulation. It is forced to the top of the compartment 1 and sprayed into the same by means of the sprays 8.

The solution passes downwardly through the compartment in the form of finely divided drops, and gas containing carbon dioxide fed through the inlet 6 passes upwardly through the compartment 1 in countercurrent relationship with the solution. Very efficient absorption of carbon dioxide is brought about by this intimate contact of the gas with the solution. The carbon dioxide is practically completely removed therefrom and the residual gases pass out of the compartment 1 through the outlet 7.

The carbon dioxide reacts with the carbonate to form bicarbonate and the resulting solution passes from the compartment 1 through the pipe 10 to the sprays 9 and downwardly through the bed of steel turnings 5 in the compartment 2. Steam from the pipe 13 is passed upwardly through the steel turnings countercurrent to the bicarbonate solution. The bicarbonate is decomposed thereby and there is a liberation of substantially pure carbon dioxide which passes out of the compartment 2 through the pipe 17.

In the process of the present invention I prefer to use solutions of potassium carbonate or potash rather than sodium carbonate or soda ash since it has been found that for high-temperature absorption, potassium carbonate is the more efficient. The process is started with a solution containing substantially 25% to 30% potassium carbonate and its circulation is so regulated that when it reaches the lower portion of compartment 1 it has cooled to substantially 70° to 80° C. At this temperature range it has been found that the velocity of carbon dioxide absorption by potash solution is at its optimum.

While the apparatus is in operation, the solution entering compartment 1 contains primarily alkali carbonate but also some bicarbonate since the bicarbonate is not usually completely decomposed in the compartment 2. The steam which is used in the compartment 2 may be exhaust steam from engine driven compressors employed for compressing the carbon dioxide gas removed through the pipe 17 from the compartment 2. In its travel upwardly through the compartment 2, the steam is practically all condensed and substantially all of this condensed steam is re-evaporated when the solution is passed downwardly through the compartment 1. In this manner a proper solution concentration is maintained.

It is desirable to provide an auxiliary heater in the form of a closed steam coil 21 in the bottom of the compartment 2. The supply of steam to the coil is controlled by a valve 22 which under normal conditions is kept closed. By means of this auxiliary heater, greater flexibility in the system is obtained.

The carbon dioxide passing out through the pipe 17 is substantially 100% pure and is at a temperature slightly above the temperature of the entering solution and contains only water vapor corresponding to the water vapor pressure of the solution at this point. Water vapor is easily removed by cooling the gas to room temperature or lower.

The gases which are treated are obtained by burning coke or from lime kilns or blast furnace stoves. Blast furnace stove gas contains as high as 27% or 28% carbon dioxide and ordinarily 20% to 25%. These gases may be previously cooled to about atmospheric temperatures and pretreated to remove dust and other materials such as sulphur dioxide and hydrogen sulphide.

Instead of building the compartments 1 and 2 as one unit as indicated in Fig. 1, they may be built as separate units as shown in Fig. 2, in which the tower 24 and the tower 25 correspond respectively to compartments 1 and 2. The gas containing carbon dioxide enters the tower 24 through a pipe 26 and the treated gas passes out through a pipe 27.

The bicarbonate solution is pumped from the bottom of the tower 24 by means of a pump 28 through a pipe 29 to the top of the tower 25 and sprayed by means of sprays 30. The steam for converting the bicarbonate solution passes into the bottom of the tower 25 through a pipe 31. A closed steam coil 32 may be provided to serve as an auxiliary heater. The carbon dioxide formed leaves the tower 25 through a pipe 33.

The solution at the bottom of the tower 25 is pumped by means of a pump 34 through a pipe 35 to the top of the tower 24 and sprayed therein by means of sprays 36. Both towers contain the desired contact material.

In the apparatus shown in both figures, the size of the chamber, which may be termed the actifier, in which the bicarbonate is decomposed to form carbon dioxide may be less than half the size up to substantially the same size as the chamber in which the absorption takes place. The actifier may be advantageously made smaller due to the fact that the reaction velocity in the actifier is apparently more than double that in the absorber. The reason for this is that there is an absence of large quantities of permanent gases in the actifier which in turn considerably affects the film coefficient of the carbon dioxide transfer.

In all cases the actifier and the absorber should be properly insulated.

In the absorber the requisite cooling of the solution coming from the actifier takes place by the evaporation of water and this evaporation of water is counterbalanced by the condensation of steam in the actifier. The concentration of the solution passing from the actifier to the absorber is substantially uniform at all times. In previous processes, tanks of bicarbonate solution were boiled to obtain carbon dioxide whereby the sodium carbonate solution formed becomes unduly concentrated and it becomes necessary to constantly replace the water lost in the boiling process.

The solution entering the actifier at substantially 70° to 80° C. tends to cool the gases passing up through the actifier chamber, and particularly in the upper regions thereof. In this way most of the steam is condensed so that substantially pure carbon dioxide passes out.

One advantage of the present invention is that relatively large and expensive apparatus, including the heat exchangers used in the ordinary process, are eliminated. The simplicity of the present apparatus with its attendant low first cost is also an important advantage. Another distinct advantage is that by the countercurrent action obtained in the actifier it is possible to decompose the bicarbonate to a considerably greater extent than when a boiler is used for this purpose.

I claim as my invention:

1. A process of preparing substantially pure carbon dioxide from gases containing the same, which process comprises spraying a hot solution containing alkali carbonate and bicarbonate into a chamber in contact with a relatively cooler gas containing carbon dioxide whereby the solution is cooled and carbon dioxide is absorbed, converting alkali carbonate to alkali bicarbonate, conducting the cooled solution to an extractor chamber at substantially that temperature at which it discharges from the carbon dioxide absorption chamber, spraying the resulting cooled solution at substantially said temperature in the extractor chamber in direct contact with steam, condensing steam in the said latter solution while heating the said latter solution with the said steam to decompose bicarbonate therein and to form carbon dioxide, and returning the so heated solution to the carbon dioxide absorption chamber at substantially that temperature at which it discharges from the extractor chamber and spraying it as aforesaid in the carbon dioxide chamber, whereby condensate from the extractor chamber is evaporated off by the contact with the carbon dioxide gas and the solution cooled thereby.

2. In a process of preparing substantially pure carbon dioxide from gases containing the same, in which process alkali bicarbonate solution is heated in an actifier zone to form carbon dioxide and the resulting alkali carbonate-containing solution is passed into an absorption zone to absorb carbon dioxide from gases, passing solution containing alkali bicarbonate from the said absorption zone into the said actifier zone in the form of a spray and into direct contact with steam to decompose the bicarbonate and to form carbon dioxide and alkali carbonate, removing carbon dioxide from the said actifier zone in substantially pure form, passing the carbonate solution directly from the said actifier zone into the said absorption zone without intermediate heating or cooling of the said carbonate solution, contacting a spray of the carbonate solution in the said absorption zone with gas containing carbon dioxide to absorb carbon dioxide from the said gas and to form alkali bicarbonate, and passing the resulting bicarbonate from the said absorption zone to the said actifier zone to obtain additional carbon dioxide, the contact of the solution with steam in the said actifier and the contact of the solution with gas in the said absorption zone being conducted to effect such heating of the solution in the said actifier zone and such cooling of the solution by the passage of vapors out with the waste gases from said absorption zone that the process carries on continuously without accumulation of excess water or excessive rise in temperature.

3. In a process of preparing substantially pure carbon dioxide from gases containing the same, in which process alkali bicarbonate solution is heated in an actifier zone to form carbon dioxide and the resulting alkali carbonate-containing solution is passed into an absorption zone to absorb carbon dioxide from gases, passing solution containing alkali bicarbonate from the said actifier zone in the form of a spray and into direct contact with steam to decompose the bicarbonate and to form carbon dioxide and alkali carbonate, removing carbon dioxide from the said actifier zone in substantially pure form, passing the carbonate solution directly from the said actifier zone into the said absorption zone without intermediate cooling of the said carbonate solution, contacting a spray of the carbonate solution in the said absorption zone with gas containing carbon dioxide to absorb carbon dioxide from the said gas and to form alkali bicarbonate, and passing the resulting bicarbonate from the said absorption zone to the said actifier zone to obtain additional carbon dioxide, the contact of the solution with steam in the said actifier zone and the contact of the solution with gas in the said absorption zone being conducted to effect condensation of steam in the said actifier zone substantially equal in amount to the vapors passing out with the waste gases from the said absorption zone.

MARK SHOELD.